United States Patent [19]

Murakoshi

[11] Patent Number: 4,602,296
[45] Date of Patent: Jul. 22, 1986

[54] SOUND RECORDING APPARATUS FOR ELECTRONIC STILL CAMERA

[75] Inventor: Makoto Murakoshi, Tokyo, Japan
[73] Assignee: Fuji Photo Film Co., Ltd., Kanagawa, Japan
[21] Appl. No.: 494,897
[22] Filed: May 16, 1983
[30] Foreign Application Priority Data
Jun. 10, 1982 [JP] Japan ................... 57-99700
[51] Int. Cl.[4] .................................. H04N 5/781
[52] U.S. Cl. ................... 360/10.1; 360/35.1; 360/33.1; 360/72.2; 360/66; 358/335; 358/341
[58] Field of Search ............... 360/8, 10.1, 35.1, 33.1, 360/72.2, 66; 358/335, 341, 906

[56] References Cited

U.S. PATENT DOCUMENTS

| | | | |
|---|---|---|---|
| 3,614,309 | 10/1971 | Presti | 360/35.1 |
| 3,878,560 | 4/1975 | Ramage | 360/10.1 |
| 4,045,819 | 8/1977 | Goldmark | 360/8 |

Primary Examiner—Alan Faber
Attorney, Agent, or Firm—Birch, Stewart, Kolasch & Birch

[57] ABSTRACT

A sound recording apparatus for a still camera has a magnetic eraser head for erasing an audio signal stored in a track of a magnetic audio disc and a magnetic write head for writing an audio signal into the track a portion of which is just emptied by the erase head, during the rotation of the audio disc. Whenever a release button of the camera is depressed to write a video signal indicative of a still image into a track on a magnetic video disc, an audio signal associated with the still image and starting from the instant a predetermined time before the shot is written into the track on the audio disc. The predetermined time is the time period for which the track on the audio disc completes one rotation. Indentification data is recorded on each of the associated audio and video tracks after the audio or video signal to facilitate reproduction thereof.

6 Claims, 2 Drawing Figures

SOUND RECORDING APPARATUS FOR ELECTRONIC STILL CAMERA

BACKGROUND OF THE INVENTION

1. Field of the Invention

The present invention relates to a sound recording system and, more particularly, to one for use with an electronic still camera.

2. Description of the Prior Art

Recently, an electronic still camera has been developed which employs a charge coupled device (CCD) or like solid-state image pickup device and a magnetic disc or like small-sized magnetic storage medium in combination. An image picked up by the still camera of the type described is written into the magnetic medium in the form of a video signal which well adapt themselves to a television system. This kind of image, therefore, is suitable for being displayed as a still picture on a soft copy display device or processed into a hard copy by an image recording device such as an ink jet printer or a laser beam electrophotographic recorder.

While reproducing an image in the form of a soft copy of a hard copy, one may desire to hear sound associated with the scene such as a narration or a piece of music. One may further desire to shoot a scene while picking up sound occurring therearound and reproduce the sound together with the scene. This demand, however, encounters a conflict that while a shot of a scene is instantaneous, sound associated with the shot has a time axis which must be reproduced dynamically in the event of reproduction.

Narration or music associated with a still picture may be simply postrecorded to have correspondence with a video signal which represents the still picture. A problem, however, exists in recording sound emitted in a scene from the standpoint of its corresponding with the scene. For example, if the recording system is automatically triggered by the depression of a release button of the camera, sound cannot be recorded except for a period after the shot. Recording sound before and after a shot will naturally furnish the resulting picture with greater realism at the time of reproduction. However, because the depression of the release button is not of the scheduled nature at all, sound before and after a shot cannot be picked up unless the device is constantly kept in operation. This not only consumes the recording medium more than necessary but obliges one to carry out troublesome work for editing the used recording medium to provide it correspondence with the successive pictures.

SUMMARY OF THE INVENTION

It is therefore an object of the present invention to provide a sound recording apparatus for an electronic still camera which is capable of recording sound over a certain period of time inclusive of the instant of a shot.

A sound recording apparatus in accordance with the present invention is applicable to an electronic still camera which records a video signal indicative of a still image time-serially, on a first recording medium. A drive means drives a second recording medium at a predetermined speed. The second recording medium is in the form of an erasable and rewritable memory of rotary element which has at least one recording unit. An audio signal is recorded recirculatively on the second medium. Recording means sequentially records a time-serial audio signal on the second recording medium with a previously recorded signal thereon erased precedingly, during a rotation of the second recording medium. A control circuit controls the drive means and recording means. Before a shot by the camera, the control circuit causes an input audio signal to be recorded constantly on at least one recording unit of the second recording medium recirculatively by the recording means. The control circuit responds to a shot by continuing the recording of the audio signal by the recording means until a first period of time expires after the instant of the shot, whereby sound generated over a period of time inclusive of the instant of the shot is recorded on the second recording medium.

In accordance with the present invention, a sound recording apparatus for a still camera has a magnetic eraser head for erasing an audio signal stored in a track of a magnetic audio disc and a magnetic write head for writing an audio signal into the track just emptied by the eraser head, during a rotation of the audio signal. Whenever a release button of the camera is depressed to write a video signal indicative of a still image into a track on a magnetic video disc, an audio signal associated with the still image and starting from the instant a predetermined time period before the shot is written into the track on the audio disc. The predetermined time is the time period for which the track on the audio disc completes one rotation. Identification data may be recorded on each of the associated audio and video tracks after the audio or video signal to facilitate reproduction thereof.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENT

Figure 1:
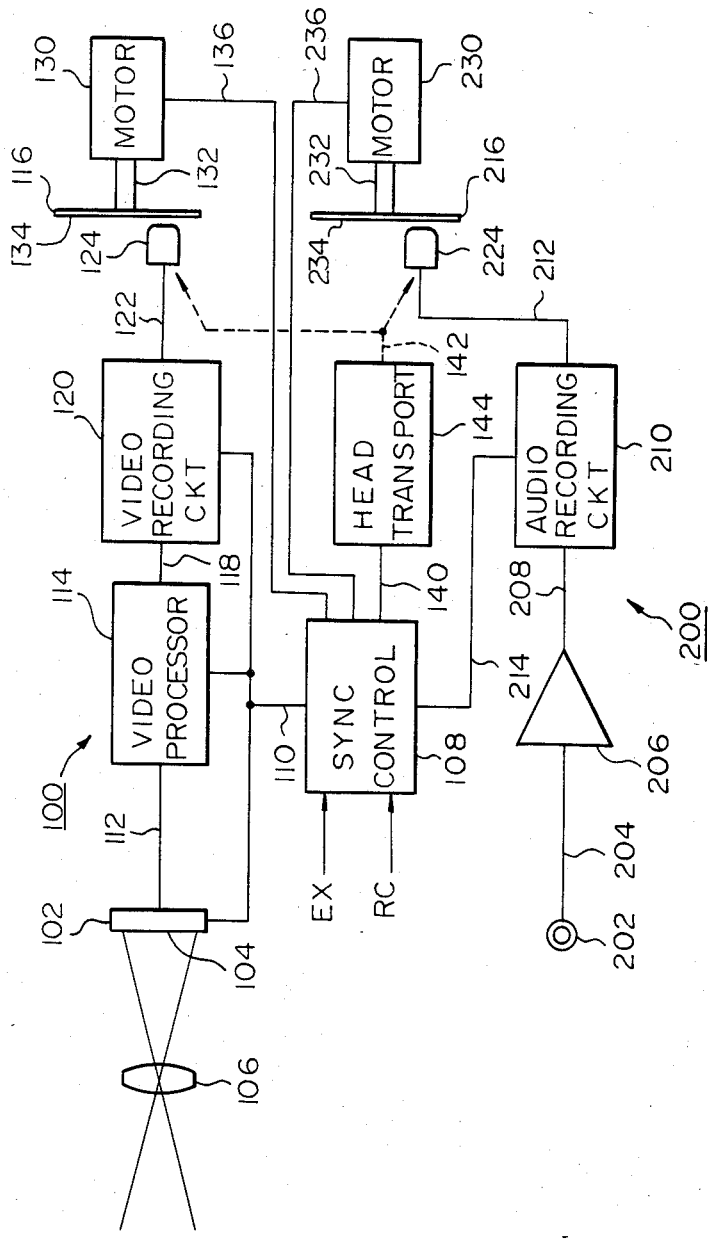
FIG. 1 is a schematic block diagram of a sound recording apparatus for an electronic still camera in accordance with the present invention.

Referring to FIG. 1 of the drawings, the sound recording apparatus of the present invention generally comprises a video section 100 and an audio section 200. The video section 100 includes a solid-state image pickup device or imager 102 which may typically be a charge coupled device (CCD). The image of an object is focused by a lens 106 onto the imaging surface or photosensitive sensor array 104 of the imager 102. A time-serial video signal representing the focused image is developed on an output 112 of the imager 102 clocked with an output signal of a synchronous control 108 on a lead 110.

The output 112 of the imager 102 is connected to a video processing circuit 114 which processes the video signal provided on the lead 112 to give it a predetermined mode and format to be recorded on a magnetic video disc 116, which will be described. The output 118 of the video processor 114 is connected to a video recording circuit 120 which modulates and amplifies the video signal supplied on the lead 118 to drive a magnetic video write head or transducer 124, which is connected to the output 122 of the video recording circuit 120.

Figure 2:
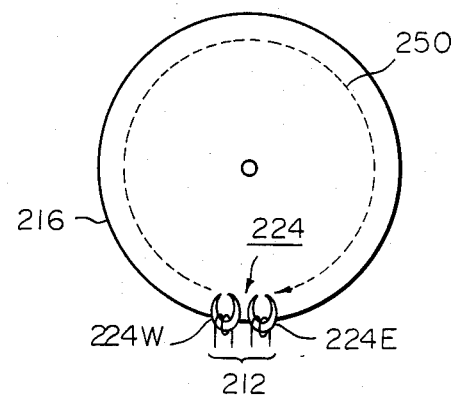
FIG. 2 is a plan view of a magnetic audio disc, useful for understanding a manner of writing an audio signal into the disc.

The audio section 200, on the other hand, includes a microphone 202 which is adapted to pick up sound during a shot or to postrecord narration, for example. The output 204 of the microphone 202 is connected via an amplifier 206 to an audio record circuit 210, the output 212 of which is connected to a magnetic write-/eraser head or transducer 224. In detail, the write-/eraser head 224 comprises a write head or transducer 224W and an eraser head or transducer 224E as shown in FIG. 2. The audio recording circuit 210 is adapted to modulate an audio signal on the output 208 of the amplifier 206 to thereby drive the write head 224W, while driving the eraser head 224E as well.

The video disc 116 is detachably mounted on an output shaft 132 of a motor 130. A magnetic audio disc 216, like the video disc 116, is detachably mounted on an output shaft 232 of a motor 230. Each of these discs 116 and 216 is a circular magnetic recording medium which resembles a floppy disc. The head 124 is positioned on a recording surface 134 of the disc 116 and the head 224 on a recording surface 234 of the disc 216. Such a recording surface 134 or 234 may be formed on one or both sides of the disc 116 or 216. As symbolically indicated by a dotted arrow 142 the heads 124 and 224 are driven together by a head transport mechanism 144 radially over the associated recording surfaces 134 and 234 of the discs, thereby selecting specific tracks on the associated discs. It will be noted that the disc 116 may be replaced by an optical disc in which video signals are recorded with a laser beam.

The motor 130 is driven by pulses supplied from the sync control 108 on a lead 136 and, in turn, drives the disc 116 for rotation at a predetermined speed such as 3,600 rpm. Likewise, the motor 230 is driven by pulses supplied by the sync control 108 on a lead 236 so that the audio disc 216 is rotated at a predetermined speed such as about 5-30 rpm. Instead of the two motors 130 and 230, a single motor may be allocated to both the discs 116 and 216 in order to rotate them at the above-mentioned different speeds with the aid of a gear mechanism or like change-speed means.

The video disc 116 has on its surface 134 a plurality of video tracks each of which is capable of storing one field of video signal (1/60 second). The audio disc 216, on the other hand, carries a plurality of audio tracks on the surface 234. One or a plurality of the audio tracks on the disc 216 are associated with one video track on the disc 116, i.e. one field of video signal. As will be described later, identification data (ID) is stored in a part of each of the video and audio tracks in order to show correspondence therebetween.

The sync control 108, as understood from the above, functions to control the video section 100 and audio section 200 by delivering various sync signals thereto.

Initially, the sync control 108 actuates the head transport mechanism 144 so that empty tracks on the discs 116 and 216 are selected to bring the heads 124 and 224 individually to the positions above the empty tracks. As soon as a release button (not shown) of the camera is depressed to shoot a scene, a signal EX indicative of the exposure is fed to the sync control 108 which then triggers the imager 102, image processor 114 and video record circuit 120 via the lead 110. This clocks the imager 102 to generate one field of video signal whose duration is 1/60 second. At the same time, the sync control 108 supplies pulses to the motor 130 over the lead 136 whereby the motor 130 is driven to cause the video disc 116 into rotation at the speed of 3,600 rpm. As a result, one field of video signal becomes recorded on one video track of the disc 116 when the video track completes one full rotation. When one field of video signal is fully stored in the video track, identification data assigned to a specific track is fed from the sync control 108 to the video write head 124 via the video record circuit 120 to be written into the track.

When a record switch (not shown) is operated prior to the shot, a signal RC is fed to the sync control 108 to actuate the audio record circuit 210. Then, an audio signal coming in through the microphone 202 is written into an audio track 250 (FIG. 2) on the disc 216 by the write head 224W. The eraser head 224E is also actuated at this instant. If the release button has not been depressed under the above condition maintaining the signal EX deenergized, audio signals sequentially provided through the microphone 202 are written into the single audio track 250 one after another without any break. That is, while the disc 216 keeps on rotating, the eraser head 224E erases an audio signal previously recorded on the track 250 to permit the write head 224W to write a new audio signal on the track 250. Therefore, assuming that the disc 216 performs rotation once per eight seconds, the signal stored in the track 250 at any moment will always be the one which started at the instant eight seconds before the moment. Where an arrangement is made such that a plurality of successive audio tracks, such as two, are allocated to a single shot, the audio signal will be recorded on the first audio track and then on the second audio track and, as the second track becomes full, again in the first track. For this purpose, the control circuit 108 will control the head transport mechanism 144 to drive the write/eraser head 224 in a reciprocal movement between the two tracks.

As the release button of the camera is actuated while the audio record system is in operation, the sync control 108 controls the video section 100 in response to a signal EX as previously described. Simultaneously with this shot, a timer circuit (not shown) installed in the sync control 108 is set. If the audio track or tracks allocated to one shot are capable of recording data over eight seconds for example, the timer may be designed to operate for presetting four seconds. When the time preset in the timer is over, the sync control 108 enters a procedure for ending the recording operation. In this case, therefore, an audio signal generated for eight seconds is written into the audio track or tracks 250 for a single shot; the former four seconds is the time period before the shot and the latter four seconds determined by the timer, the time period after the shot.

As soon as the time preset in the timer is expired (four seconds in this embodiment), the sync control 108 supplies the audio recording circuit 210 with track identification data which is the same as the data written into the video track. The head 224 writes the identification data in the audio track 250 while the sync control 108 deactuates the video section 100 and audio section 200. The identification data stored in the audio track 250 not only matches the track 250 to the associated video track but indicates the head and tail of a unit audio signal which lasts eight seconds.

The timer in the sync control 108 may be constructed to be initialized every time the signal EX is energized. Then, in the consecutive shoot mode or the superpose shoot mode, a count in the timer will be renewed in response to each signal EX and, therefore, sound recording will terminate upon the lapse of a predetermined period of time after the consecutive or superpose shooting. If desired, the design of the timer may be such that it becomes initialized only by the signal EX which is produced in response to the initial shot. Such a timer design will allow an audio signal associated with the initial shot in the consecutive or superpose shoot mode to be recorded for a predetermined period of time.

When it is desired to postrecord music or narration after a shot, a sound record switch is manipulated to feed a signal RC to the sync control 108 so that the system will function in the manner described.

To reproduce the image and sound, a reproducing apparatus finds out the associated video and autio tracks indexed by the identification data stored therein. The video signals in the video tracks are read out at a speed of 1/60 seconds per track so that one field of still picture is repeatedly displayed on a cathode ray tube (CRT) or like display. Meanwhile, the audio signals recorded on the audio tracks are read out at a speed of, for example, eight seconds per track whereby the sound associated with the displayed picture is repeatedly reproduced through a loud speaker or the like.

In summary, it will be seen that the present invention provides a sound recording system for an electronic still camera which is capable of recording sound generated before a shot while matching it to an image field. In practice, sound can be recorded over a certain period of time starting from the instant a predetermined time before the depression of a release button and inclusive of the instant of the shot. While the embodiment has been shown and described as determining a sound recording time after a shot by means of a timer, the sound recording time may be designed variable as desired by making the timer manually controllable or by employing a manual record stop mechanism. Additionally, such a manner of sound recording eliminates wasteful consumption of a recording medium and realizes desirable correspondence between sound and image which frees one from troublesome editing work.

Various modifications will become possible for those skilled in the art after receiving the teachings of the present disclosure without departing from the scope thereof.

What I claim is:

1. An electronic still camera comprising:
    first recording means responsive to an exposure signal of a shot for sensing a still image of an object to record a video signal indicative of a still image time-serially on a first recording medium;
    drive means for driving a second recording medium at a predetermined speed, the second recording medium being in the form of an erasable and rewritable memory of a rotary element which has at least one recording unit, an audio signal being recorded recirculatively on the second recording medium;
    second recording means for recording sequentially a time-serial audio signal on the second recording medium, said recording being preceded by the erasing of any previously recorded signal on said second recording medium, during a rotation of the second recording medium; and
    a control circuit for controlling the drive means, and first and second recording means;
    said control circuit causing, before a shot by the camera, an input audio signal to be recorded constantly on at least one recording unit of the second recording medium recirculatively by the second recording means, the control circuit responding to a shot by continuing the recording of the audio signal by the second recording means until a first period of time expires after the instant of the shot, whereby sound generated over a period of time inclusive of the instant of the shot is recorded on the second recording medium.

2. A camera in accordance with claim 1, in which the second recording medium comprises a magnetic disc, the second recording means comprising a magnetic write head for writing an audio signal into said magnetic disc and a magnetic eraser head located immediately ahead of the write head with respect to an intended direction of movement of a recording tack on the magnetic disc.

3. A camera in accordance with claim 2, in which the control circuit, when finishing the recording operation of an audio signal performed by the second recording means, writes identification data associated with the shot into an associated recording unit in the second recording medium.

4. A camera in accordance with claim 2, in which the control circuit includes a timer circuit for counting the first time period in response to the shot.

5. A camera in accordance with claim 1, in which the control circuit, when finishing the second recording operation of an audio signal performed by the recording means, writes identification data associated with the shot into an associated recording unit in the second recording medium.

6. A camera in accordance with claim 1, in which the control circuit includes a timer circuit for counting the first time period in response to the shot.

* * * * *